(12) United States Patent
Guey et al.

(10) Patent No.: US 9,154,974 B2
(45) Date of Patent: Oct. 6, 2015

(54) DYNAMIC, DISTRIBUTED COORDINATION OF PARAMETERS IN A CELLULAR TELECOMMUNICATION NETWORK

(75) Inventors: Jiann-Ching Guey, Fremont, CA (US); Dennis Hui, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 712 days.

(21) Appl. No.: 13/072,496

(22) Filed: Mar. 25, 2011

(65) Prior Publication Data

US 2012/0244898 A1 Sep. 27, 2012

(51) Int. Cl.
*H04B 1/38* (2015.01)
*H04W 24/02* (2009.01)
*H04W 16/10* (2009.01)

(52) U.S. Cl.
CPC ............ *H04W 24/02* (2013.01); *H04W 16/10* (2013.01)

(58) Field of Classification Search
USPC ........................................................ 455/561
See application file for complete search history.

(56) References Cited

U.S. PATENT DOCUMENTS

| | | | |
|---|---|---|---|
| 6,314,084 B1 * | 11/2001 | Kahale et al. ................. | 370/230 |
| 6,535,739 B1 * | 3/2003 | Chen et al. ..................... | 455/437 |
| 7,096,039 B2 * | 8/2006 | Chuah et al. ................... | 455/561 |
| 2008/0064361 A1 * | 3/2008 | Bjork et al. .................... | 455/403 |
| 2009/0047968 A1 * | 2/2009 | Gunnarsson et al. ......... | 455/446 |
| 2010/0227603 A1 | 9/2010 | Gupta et al. | |
| 2010/0261482 A1 * | 10/2010 | Guey .......................... | 455/452.2 |
| 2010/0261493 A1 * | 10/2010 | Guey et al. .................... | 455/501 |
| 2012/0149413 A1 * | 6/2012 | Pedersen ....................... | 455/501 |
| 2013/0072131 A1 * | 3/2013 | Guey et al. ...................... | 455/68 |

FOREIGN PATENT DOCUMENTS

WO WO 2009/120127 A1 10/2009

* cited by examiner

*Primary Examiner* — David Bilodeau

(57) ABSTRACT

An apparatus, system, and method for dynamic, distributed coordination of parameters between a plurality of base stations in a cellular telecommunication network. An inter-cell communication interface connecting each given base station with the given base station's neighboring base stations is extended to communicate parameter settings between the given base station and the neighboring base stations. An apparatus in each given base station receives from the given base station's neighboring base stations, parameter settings being utilized by the neighboring base stations for transmitting and/or receiving in associated neighboring cells. The apparatus utilizes the parameter settings received from the neighboring base stations as factors to determine local parameter settings for the given base station. The given base station then sends the local parameter settings and supplemental information to the neighboring base stations so that optimal network-wide parameter settings can be selected.

18 Claims, 3 Drawing Sheets

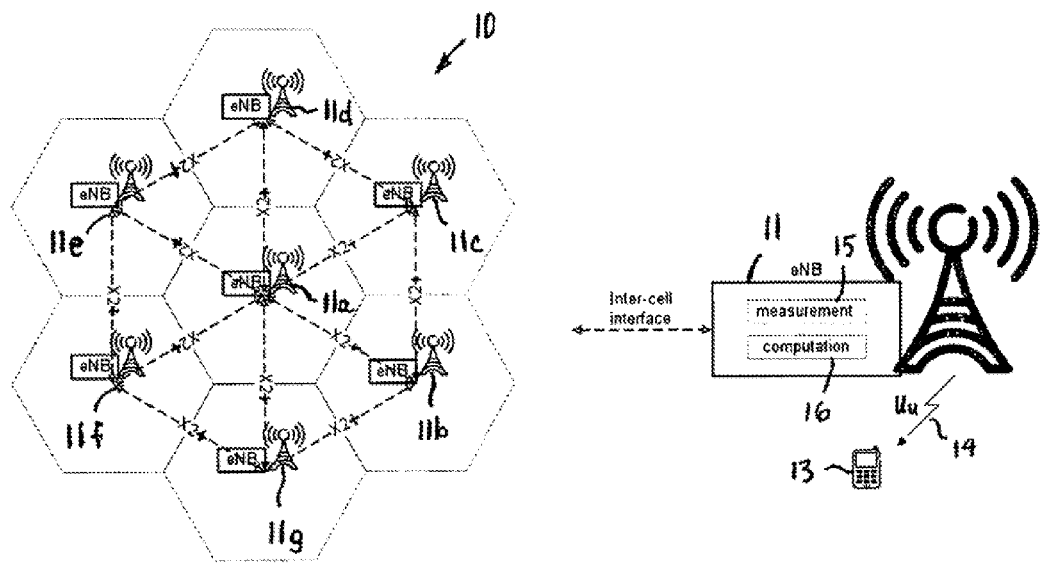
FIG. 1
FIG. 2
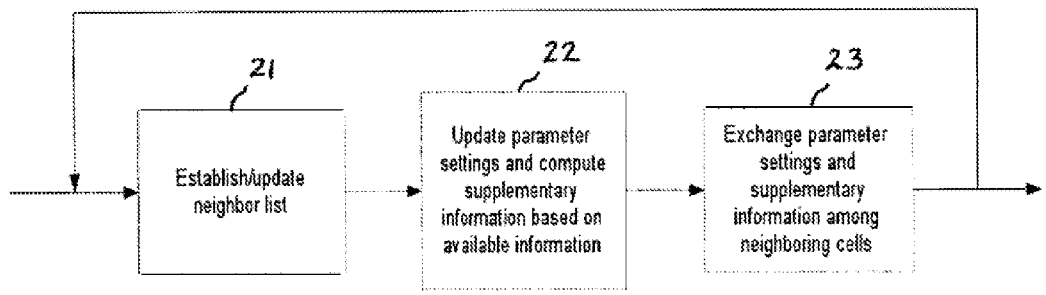
FIG. 3

DYNAMIC, DISTRIBUTED COORDINATION OF PARAMETERS IN A CELLULAR TELECOMMUNICATION NETWORK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to cellular telecommunication systems. More particularly, and not by way of limitation, the present invention is directed to an apparatus, system, and method for dynamic, distributed coordination of parameters between a plurality of base stations in a cellular telecommunication network.

In a cellular network, it is sometimes necessary for each base station in the network to select a set of parameters that is uniquely distinguishable from those in use in the base station's immediate neighboring cells. For a downlink transmission, for example, each base station needs to transmit a locally unique Reference Signal (RS) to enable User Equipments (UEs) operating within the base station's cell to identify the cell and to synchronize to the downlink transmission. Each base station needs to select (or have assigned) an RS that is different from the base station's immediate neighboring cells. In another example, each base station may select (or be assigned) one of several frequency bands for transmission. If the same frequency band is only reused in other cells that are far away, inter-cell interference can be significantly reduced. This is the classical frequency planning methodology commonly practiced in second generation networks such as the Global System for Mobile Communications (GSM).

There are also occasions when each base station may need to set a value to a parameter such as transmit power or radio radiation beam direction, in such a way that the setting is compatible with the settings of neighboring cells in order to optimize performance of the entire network.

SUMMARY

The above are typical considerations encountered in the design of a cellular network in which a local parameter setting in a given cell influences and is influenced by the settings of neighboring cells. In many instances, these inter-cell influences are static in nature and can therefore be solved by advanced planning during the build-out of the network. In existing networks, the parameters are set by planning tools that have access to information such as base station locations and radio propagation characteristics. Once an optimal network-wide solution is found, the parameters remain unchanged for an extended period until the deployment configuration changes.

In some applications, however, the parameter settings may need to adapt to short-term changes. For example, the static frequency reuse planning tool has recently been extended to fractional use to improve the performance of a reuse-1 network. In Fractional Frequency Reuse (FFR), each cell selects (or is assigned to) one of several non-overlapping cell-edge frequency bands. The cell-edge band is reserved on the uplink for UEs that are located near the edge of the cell. These UEs typically generate and experience more interference than the cell-center UEs. Therefore, if neighboring cells reserve cell-edge bands that are different from each other for the uplink transmission of their attached UEs, the inter-cell interference can be significantly reduced, especially for the cell-edge UEs. The interference condition, however, changes dynamically as UEs migrate. Therefore, which cell-edge band a cell uses should also change accordingly. The static frequency reuse planning method cannot keep up with such dynamic changes. Even if it could, it would require a computerized central coordinator to collect and process the global information required to perform dynamic updates. Such central coordinator may not be available in the network.

The present invention provides a solution to the above-mentioned problems. The invention computes and sets parameters in a distributed and dynamic manner by exchanging parameters and other supplementary information between each base station and its neighboring base stations, and by updating parameter settings according to the exchanged information. Various embodiments described herein disclose an apparatus and method pertaining to the procedure of such exchange and update as well as specific decision making algorithms with desirable convergence properties.

In one embodiment, the present invention is directed to an apparatus in a first base station for dynamic, distributed coordination of parameters between the first base station and a plurality of neighboring base stations in a cellular telecommunication network. The apparatus includes a processor that controls the operation of the apparatus when executing computer program instructions stored on a non-transitory memory device. The processor controls an interface unit that receives from the neighboring base stations, parameter settings being utilized by the neighboring base stations for transmitting and/or receiving in associated neighboring cells. The processor also controls a parameter computer that utilizes the parameter settings received from the neighboring base stations as factors to determine local parameter settings for use by the first base station for transmitting and/or receiving in a first cell associated with the first base station. The processor may also control the interface unit to send the local parameter settings to the neighboring base stations.

In another embodiment, the present invention is directed to a method in a first base station for dynamic, distributed coordination of parameters between the first base station and a plurality of neighboring base stations in a cellular telecommunication network. The method includes the steps of updating a neighbor list of neighboring base stations that neighbor the first base station; receiving from the neighboring base stations on an inter-cell interface, parameter settings being utilized by the neighboring base stations for transmitting and/or receiving in associated neighboring cells; and utilizing the parameter settings received from the neighboring base stations as factors to determine local parameter settings for use by the first base station for transmitting and/or receiving in a first cell associated with the first base station. The method may also include sending the local parameter settings to the neighboring base stations.

In another embodiment, the invention is directed to a system for dynamic, distributed coordination of parameters between a plurality of base stations in a cellular telecommunication network. The system includes an inter-cell communication interface connecting each given base station with the given base station's neighboring base stations, wherein the interface communicates parameter settings between the given base station and the neighboring base stations. The system also includes an apparatus in each given base station that receives from the given base station's neighboring base stations, parameter settings being utilized by the neighboring base stations for transmitting and/or receiving in associated neighboring cells; that utilizes the parameter settings received from the neighboring base stations as factors to determine local parameter settings for the given base station; and that sends the local parameter settings for the given base station to the neighboring base stations.

As described in detail below, the invention advantageously provides dynamic, distributed coordination of cell parameters in a cellular network. The described embodiments require no centralized coordinator and thus flatten the network hierarchy. A three-step coordination procedure adapts to a changing environment and ensures convergence to a globally optimal solution with properly designed algorithms. By staggering the updates over orthogonal partitions of the cells, or by providing randomized updates, a ping-pong effect is avoided and convergence to the globally optimal solution is ensured.

BRIEF DESCRIPTION OF THE DRAWINGS

In the following section, the invention will be described with reference to exemplary embodiments illustrated in the figures, in which:

FIG. 1 is an illustrative drawing of a cellular network enhanced in accordance with an exemplary embodiment of the present invention;

FIG. 2 illustrates a simplified eNB enhanced in accordance with an exemplary embodiment of the present invention;

FIG. 3 is a flow chart of an exemplary embodiment of the method of the present invention;

DETAILED DESCRIPTION

Figure 4:
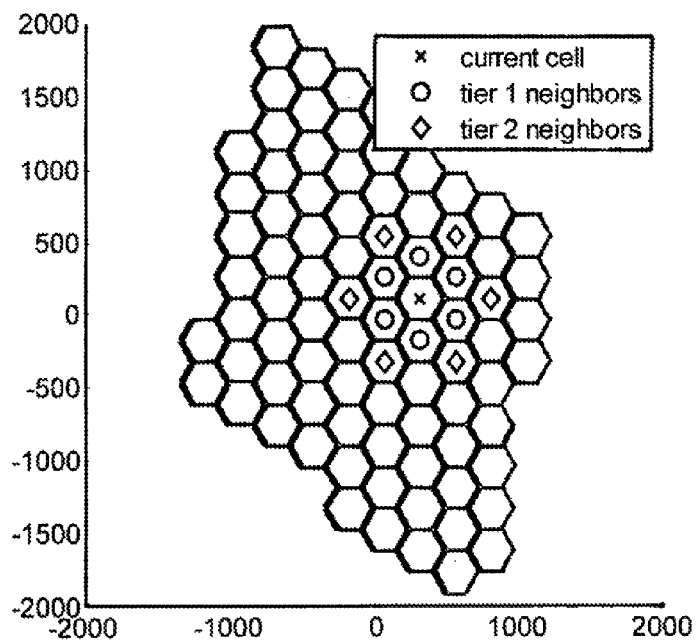
FIG. 4 is an illustrative drawing of a plurality of neighboring cells categorized into multiple tiers according to their proximity to a current serving cell.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although embodiments of the invention are described herein in terms of a Long Term Evolution (LTE) radio access network, the invention may be implemented in any cellular telecommunication network.

FIG. 1 is an illustrative drawing of a cellular network 10 enhanced in accordance with an exemplary embodiment of the present invention. For exemplary purposes, FIG. 1 illustrates an LTE radio access network in which the base stations correspond to enhanced Node Bs (eNBs). A plurality of eNBs 11a-11g are connected to their neighboring eNBs through an enhanced inter-cell interface (X2+) 12. Each eNB is illustrated within a cell representing the eNB's effective coverage area. In existing LTE networks, an inter-cell X2 interface between the eNBs is utilized to support inter-eNB handover. In one embodiment of the present invention, the X2 interface is extended to carry measurements and computational information between the eNBs required to dynamically update parameter settings. The extended X2 interface is denoted herein as the X2+ interface.

It should be understood that the X2+ interface is not limited to a switched link directly between the eNBs as illustrated in FIG. 1. In other embodiments, the X2+ interface may be, for example, a link relayed by the UEs over the Uu interface, or a link relayed over the S1 interface by another network entity such as a Serving Gateway (S-GW) or Mobility Management Entity (MME).

FIG. 2 illustrates a simplified eNB 11 enhanced in accordance with an exemplary embodiment of the present invention. FIG. 2 primarily shows that the eNB communicates with a UE 13 over the Uu interface 14, and is enhanced to send measurements 15 and parameter computations 16 over the inter-cell X2+ interface 12 to other eNBs. A more detailed description of the eNB is provided below in connection with FIG. 6.

The parameter may be, for example, power control parameters, beamforming coefficients, reuse frequencies, coefficients used to program the receiver to suppress interference from a certain direction, and the like.

FIG. 3 is a flow chart illustrating the steps of an exemplary embodiment of the method of the present invention. The method executes the distributed parameter adaptation utilizing three broadly defined steps. At step 21, a neighbor list is established or updated for each cell in the network. At step 22, each base station or eNB then updates its parameter settings based on its neighbors' settings and other supplementary information that have been made available through prior information exchanged on the inter-cell interface. Each base station or eNB may also update relevant supplementary information to be passed onto its neighbors. At step 23, the each base station or eNB exchanges the updated parameter settings and supplementary information among its neighboring cells through the inter-cell interface. The parameter and information exchange is designed so that a global optimum may be reached through repetitive applications of the distributed procedure.

The supplementary information exchanged between the base stations may include, for example, preference information regarding parameter settings of tier-1 neighbors, information for coordinating the timing of updates among a plurality of base stations, or channel gain as described below. Each base station only knows a small portion of the gain matrix G in equation (1) below. The more a given base station learns about this matrix from its neighbors, the better the given base station can compute an optimal parameter setting.

The following description describes in detail steps 21-23 of FIG. 3 and variants of the procedures involving these steps. As a further example, a scenario is described in which the objective of the distributed coordination is to achieve the classical reuse partitioning commonly seen in frequency reuse planning of a cellular network. For a given reuse factor N, each cell is assigned one of N possible frequencies. An optimal reuse plan would ensure each cell is assigned a different frequency from its adjacent neighbors. A greater number of neighbors requires a higher reuse factor to achieve optimality. In this example, the reuse factor N equals 3.

Establishing Neighbor List

A neighboring cell can be any cell that may be affected by the parameters set by the current cell or any cell whose parameter settings may influence the current cell (the relationship may not be reciprocal). The neighbor list may be statically determined by geographical proximity at the time of deployment or dynamically changed as interference conditions change due to traffic re-distribution. In the latter case, for example, the neighboring cells may share the path gain matrix given by:

$$G = \begin{bmatrix} g_{11} & g_{12} & \Lambda & \Lambda & g_{1N} \\ g_{21} & g_{22} & \Lambda & \Lambda & g_{2N} \\ M & M & O & & M \\ M & M & & O & M \\ g_{M1} & g_{M2} & \Lambda & \Lambda & g_{MN} \end{bmatrix}, \quad (1)$$

where $g_{mn}$ is the path gain between the m'th UE and the n'th cell. Such a path gain matrix may be obtained by measurements made by the base stations, reports sent from the UEs, and/or the inter-cell interface between neighboring base stations. By comparing, for a certain UE (row vector in the equation), the ratio between the path gain of an interfering cell and the path gain of the serving cell against a threshold, it can be determined whether each cell is a dominant downlink interferer to the other and thus whether the cells are considered neighbors to each other. An uplink neighbor list can also be derived similarly.

FIG. 4 is an illustrative drawing of a plurality of neighboring cells categorized into multiple tiers according to their proximity to a current serving cell. In this example, neighbor cells in a first tier (designated by a circle) are the nearest six cells surrounding the serving cell (designated by an X). The tier-1 neighbors are all one inter-site distance away from the serving cell in this homogeneous hexagonal layout. The tier-2 neighbors are the six cells with an inter-site distance of $\sqrt{3}$ from the serving cell. For a reuse factor of 3, the tier-1 neighbors should be assigned frequencies different from that assigned to the serving cell while the second tier neighbors should be assigned the same frequency as the serving cell.

Update Parameter Settings Based on Received Information

Once the neighbor list is established, each base station can then update its parameter settings based on its neighbors' parameter settings and any other supplementary information required to approach a globally optimal solution. The neighbors' parameter settings and other supplementary information may be delayed due to latency in the inter-cell communication interface. The base station may update parameter settings whenever new information is received or at a defined interval. However, it may be advantageous to avoid simultaneous updates of every cell, which may lead to alternation between sub-optimal states, or the so-called ping-pong effect. One way to avoid this phenomenon is to have each cell randomly and independently choose whether to update with a certain probability at a given time instant. This way, only a randomly selected subset of cells is actively updating at the given time instant. An alternative method is shown in FIG. 5.

Figure 5:
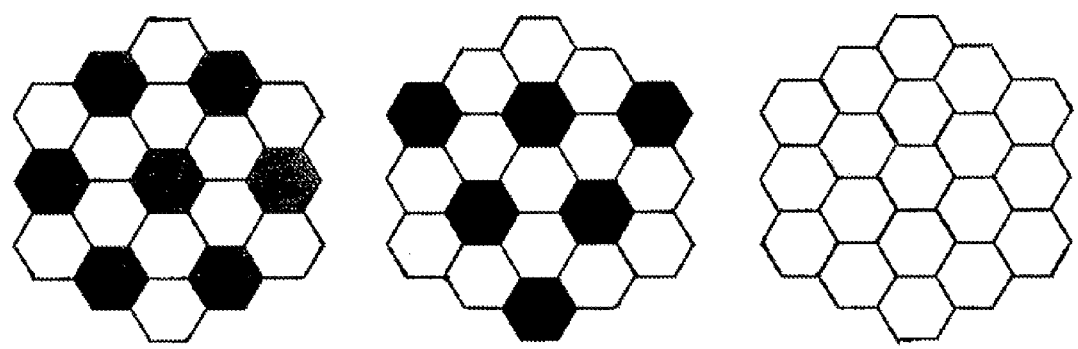
FIG. 5 is an illustrative drawing of a partitioning of a plurality of neighboring cells into groups of orthogonal subsets.

FIG. 5 is an illustrative drawing of a partitioning of a plurality of neighboring cells into groups of "orthogonal" subsets. Orthogonal in this instance means that cells in a subset are not tier-1 neighbors with any other members in the same subset. The cells in the same subset can update simultaneously without affecting each other's decision since they are not neighbors to each other. Only one subset performs updates at any given time instant. Each base station can be provisioned with update timing information, or a controller such as a Base Station Controller (BSC) or Radio Network Controller (RNC) can control the update timing in the different subsets of cells.

The action taken to determine each updated parameter setting depends on the objective of the specific problem and the available information received from the neighboring cells. In the example of achieving the classical reuse partitioning with a reuse factor N of 3, the parameter has three possible values. Each value corresponds to one of the three frequencies in the reuse plan, and the algorithm for updating the parameter in the current cell is given as follows:

1. Find $S_0$, the setting that has the least coincidence with those of the current cell's tier-1 neighbors.
2. If $S_0$ is different from all neighbors' settings, then the current cell's setting is updated to $S_0$.
3. If $S_0$ is not different from all neighbors' settings, check the settings favored by the current cell's neighbors (both tiers, to be described in step 4 below). Update the current cell's setting to one that receives the most votes, i.e., the setting that is favored by most neighbors.
4. Compute the supplementary information based on the updated setting:
   a. Preference over tier-1 neighbors: for each of the current cell's tier-1 neighbors, compute the current cell's preference for that tier-1 neighbor's parameter setting as follows: from the two possible settings that are different from the current cell's setting, select the setting that is least in common with the settings of the rest of the tier-1 neighbors.
   b. Preference over tier-2 neighbors: for each of the current cell's tier-2 neighbors, compute the current cell's preference for that tier-2 neighbor's parameter setting as follows: select the most common setting among all tier-2 neighbors and the current cell, excluding the tier-2 cell for which the computation is performed.

Experiments show this procedure always converges to the globally optimal reuse-3 plan.

Exchange of Parameter Settings and Other Supplementary Information

After updating parameter settings and supplementary information, each cell communicates the updated parameter settings and supplementary information with its neighbors through any available interface.

The 3-step procedure of FIG. 3 can continue indefinitely. For a well-designed algorithm, the settings should eventually converge and no new update will be made unless a change in the environment occurs. Such change may include movements of UEs, new UEs coming into the system or existing UEs leaving the system, or the addition or removal of cells in the network. The procedure may also be triggered to start by a command received from a node higher in the network hierarchy such as an LTE Gateway. The procedure may be stopped after a set period of inactivity or after a predetermined time. Note also that the order of the three steps may be permuted without loss of generality. For example, the base station may choose to execute the information exchange phase before the parameter update phase.

Figure 6:
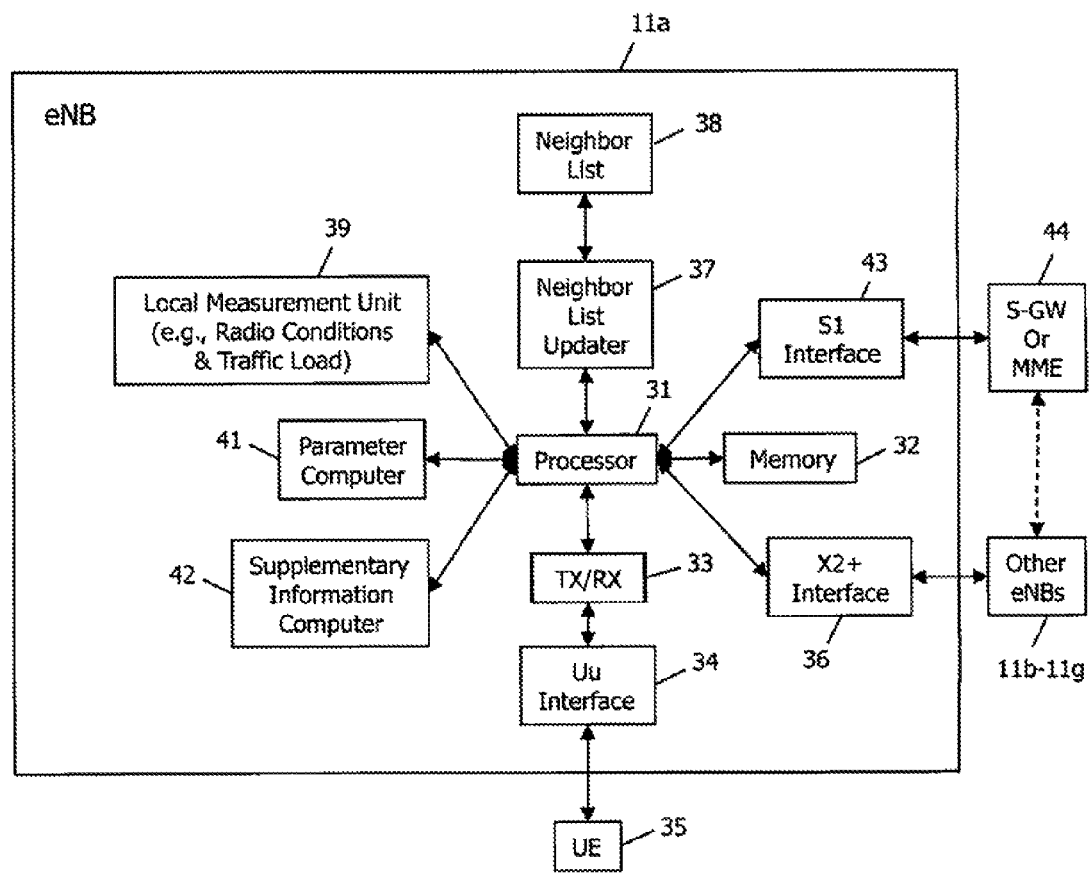
FIG. 6 is a simplified block diagram illustrating more detail of the eNB.

FIG. 6 is a simplified block diagram illustrating more detail of the eNB 11 such as, for example, eNB 11a of FIG. 1. Operation of the eNB may be controlled by a processor or microprocessor 31 executing computer program instructions stored on a non-transitory memory device 32. The process controls a transceiver (TX/RX) 33 to communicate over the Uu interface 34 with UEs 34. The processor also communicates over the X2+ interface 36 to send and receive information typically transmitted over the X2 interface in LTE networks, and also to send and receive measurement and computed parameter values with other eNBs 11b-11g. The processor also controls a neighbor list updater 37 to update the neighbor list 38. The neighbor list updater may dynamically update the neighbor list as interference conditions change due to traffic re-distribution. The updated neighbor list is provided to the processor 31 so that communications over the X2+ interface are conducted with the appropriate neighbor cells.

The eNB 11a also includes a local measurement unit 39 for collecting measurements such as radio conditions and traffic load necessary for computing the parameters for the eNB. A parameter computer 41 computes the parameters based on inputs from the local measurement unit and from neighboring eNBs 11b-11g via the X2+ interface 36. A supplementary information computer 42 computes supplementary information, which is shared with neighboring eNBs to approach a globally optimal solution.

As previously noted, rather than using the X2+ interface 36, the eNB 11a may alternatively communicate with neighboring eNBs over the S1 interface 43 via either an S-GW or MME 44.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. An apparatus in a first base station for dynamic, distributed coordination of physical-layer transmission parameters between the first base station and a plurality of neighboring base stations in a cellular telecommunication network, the apparatus comprising:
   a processor that controls the operation of the apparatus when executing computer program instructions stored on a non-transitory memory device, wherein the processor controls the following components of the apparatus:
      an interface unit configured to receive from the neighboring base stations, parameter settings for the transmission parameters being utilized by the neighboring base stations for transmitting and/or receiving radio signals with User Equipments (UEs) in associated neighboring cells;
      a neighbor list updater configured to dynamically update a neighbor list of the neighboring base stations;
      a parameter computer that utilizes the parameter settings received from the neighboring base stations as factors to determine local parameter settings for the transmission parameters for use by the first base station for transmitting and/or receiving radio signals in a first cell associated with the first base station; and
      a supplementary information computer that utilizes the local parameter settings and the parameter settings received from the neighboring base stations as factors to dynamically compute supplementary information for computing a path gain matrix (G) shared by the first base station and the neighboring base stations;
   wherein the processor also controls the interface unit to send the local parameter settings and the supplementary information to the neighboring base stations on the neighbor list;
   wherein the processor controls the components of the apparatus to iteratively perform the following exchange multiple times with the neighboring base stations in the neighbor list until a convergence condition is satisfied:
      reception of the parameter settings from the neighboring base stations, and
      transmission of the local parameter settings and the supplementary information to the neighboring base stations;
   wherein the first base station and the neighboring base stations utilize the supplementary information to determine which base stations are dominant downlink interferers and to select parameter settings for optimal performance of the entire network; and
   wherein each neighboring base station includes its own apparatus performing the same functions as the apparatus in the first base station.

2. The apparatus as recited in claim 1, wherein:
   the neighbor list updater adds a given base station to the neighbor list whenever path gain measurements from the first base station and the given base station indicate the given base station is a dominant downlink interferer; and
   the neighbor list updater removes the given base station from the neighbor list whenever the path gain measurements from the first base station and the given base station indicate the given base station is not a dominant downlink interferer.

3. The apparatus as recited in claim 1, wherein the supplementary information exchanged between the base stations also includes at least one of:
   preference information regarding parameter settings of immediately adjacent neighboring base stations; and
   information for coordinating the timing of updates among a plurality of base stations.

4. The apparatus as recited in claim 1, wherein the path gain matrix (G) is given by:

$$G = \begin{bmatrix} g_{11} & g_{12} & \cdots & \cdots & g_{1N} \\ g_{21} & g_{22} & \cdots & \cdots & g_{2N} \\ \vdots & \vdots & \ddots & & \vdots \\ \vdots & \vdots & & \ddots & \vdots \\ g_{M1} & g_{M2} & \cdots & \cdots & g_{MN} \end{bmatrix},$$

where $g_{mn}$ is the path gain between the m'th UE and the n'th base station; and
   wherein the apparatus is configured to determine whether a given base station is a dominant interferer for a given UE by comparing the ratio between the path gain of the given base station and the path gain of the UE's serving base station against a threshold.

5. A method in a first base station for dynamic, distributed coordination of physical-layer transmission parameters between the first base station and a plurality of neighboring base stations in a cellular telecommunication network, the method comprising the steps of:
   updating a neighbor list of neighboring base stations that neighbor the first base station;
   receiving from the neighboring base stations on an inter-cell interface, parameter settings for the transmission parameters being utilized by the neighboring base stations for transmitting and/or receiving radio signals with User Equipments (UEs) in associated neighboring cells;
   utilizing the parameter settings received from the neighboring base stations as factors to determine local parameter settings for the transmission parameters for use by the first base station for transmitting and/or receiving radio signals in a first cell associated with the first base station;
   utilizing the local parameter settings and the parameter settings received from the neighboring base stations as factors to dynamically compute supplementary information for computing a path gain matrix (G) shared by the first base station and the neighboring base stations;

utilizing the inter-cell interface to send the local parameter settings and the supplementary information to the neighboring base stations on the neighbor list; and further utilizing the inter-cell interface to iteratively perform the following exchange multiple times with the neighboring base stations in the neighbor list until a convergence condition is satisfied:

reception of the parameter settings from the neighboring base stations, and transmission of the local parameter settings and the supplementary information to the neighboring base stations;

wherein the first base station and the neighboring base stations utilize the supplementary information to determine which base stations are dominant downlink interferers and to select parameter settings for optimal performance of the entire network; and wherein each neighboring base station performs the method as performed by the first base station.

6. The method as recited in claim 5, wherein the receiving step also includes receiving supplementary information from the neighboring base stations, and the utilizing step includes utilizing the supplementary information and the parameter settings received from the neighboring base stations to select the local parameter settings.

7. The method as recited in claim 6, further comprising the steps of:

updating the supplementary information; and sending the updated supplementary information to the neighboring base stations on the neighbor list.

8. The method as recited in claim 5, wherein the supplementary information exchanged between the base stations also includes at least one of:

preference information regarding parameter settings of immediately adjacent neighboring base stations; and information for coordinating the timing of updates among a plurality of base stations.

9. The method as recited in claim 5, wherein the path gain matrix (G) is given by:

$$G = \begin{bmatrix} g_{11} & g_{12} & \cdots & \cdots & g_{1N} \\ g_{21} & g_{22} & \cdots & \cdots & g_{2N} \\ \vdots & \vdots & \ddots & & \vdots \\ \vdots & \vdots & & \ddots & \vdots \\ g_{M1} & g_{M2} & \cdots & \cdots & g_{MN} \end{bmatrix},$$

where $g_{mn}$ is the path gain between the m'th UE and the n'th base station; and utilizing the supplementary information to determine which base stations are dominant interferers includes determining whether a given base station is a dominant interferer for a given UE by comparing the ratio between the path gain of the given base station and the path gain of the UE's serving base station against a threshold.

10. A system for dynamic, distributed coordination of physical-layer transmission parameters between a plurality of base stations in a cellular telecommunication network, the system comprising:

an inter-cell communication interface connecting each given base station with the given base station's neighboring base stations, wherein the interface communicates parameter settings for the transmission parameters between the given base station and the neighboring base stations; and an apparatus in each given base station configured to:

update a neighbor list of neighboring base stations that neighbor the given base station;

receive from the given base station's neighboring base stations, the parameter settings for the transmission parameters being utilized by the neighboring base stations for transmitting and/or receiving radio signals with User Equipments (UEs) in associated neighboring cells;

utilize the parameter settings received from the neighboring base stations as factors to determine local parameter settings for the transmission parameters for transmitting and/or receiving radio signals by the given base station;

utilize the inter-cell communication interface to send the local parameter settings for the given base station to the neighboring base stations;

utilize the local parameter settings and the parameter settings received from the neighboring base stations as factors to dynamically compute supplementary information for computing a path gain matrix (G) shared by the given base station and the neighboring base stations;

utilize the inter-cell communication interface to send the local parameter settings and the supplementary information to the neighboring base stations on the neighbor list; and further utilize the inter-cell communication interface to iteratively perform the following exchange multiple times with the neighboring base stations in the neighbor list until a convergence condition is satisfied:

reception of the parameter settings from the neighboring base stations, and transmission of the local parameter settings and the supplementary information to the neighboring base stations; and wherein the given base station and the neighboring base stations utilize the supplementary information to determine which base stations are dominant downlink interferers and to select parameter settings for optimal performance of the entire network.

11. The system as recited in claim 10, wherein each apparatus includes a processor and a non-transitory memory device, wherein the processor controls the operation of the apparatus when executing computer program instructions stored on the non-transitory memory device.

12. The system as recited in claim 11, wherein the processor also controls a neighbor list updater to dynamically update, within each given base station, the neighbor list of the given base station's neighboring base stations.

13. The system as recited in claim 12, wherein:

the neighbor list updater adds a candidate base station to the given base station's neighbor list whenever path gain measurements from the given base station and the candidate base station indicate the candidate base station is a dominant downlink interferer; and the neighbor list updater removes the candidate base station from the given base station's neighbor list whenever the path gain measurements from the given base station and the candidate base station indicate the candidate base station is not a dominant downlink interferer.

14. The system as recited in claim 12, wherein the processor also controls the apparatus to send the local parameter settings and the supplementary information to the neighboring base stations on the neighbor list.

15. The system as recited in claim 10, wherein each apparatus includes a parameter computer that computes updated local parameter settings for each given base station at random time intervals independent of other base stations.

16. The system as recited in claim 10, wherein the plurality of base stations are partitioned into multiple subsets in which base stations in each given subset are not tier-1 neighbors to other base stations in the same subset, and the base stations in each given subset update their local parameter settings at the same time, wherein the update time for each given subset differs from times at which base stations in other subsets update their parameters.

17. The system as recited in claim 10, wherein the supplementary information exchanged between the base stations also includes at least one of:
  preference information regarding parameter settings of immediately adjacent neighboring base stations; and
  information for coordinating the timing of updates among a plurality of base stations.

18. The system as recited in claim 10, wherein the path gain matrix (G) is given by:

$$G = \begin{bmatrix} g_{11} & g_{12} & \cdots & \cdots & g_{1N} \\ g_{21} & g_{22} & \cdots & \cdots & g_{2N} \\ \vdots & \vdots & \ddots & & \vdots \\ \vdots & \vdots & & \ddots & \vdots \\ g_{M1} & g_{M2} & \cdots & \cdots & g_{MN} \end{bmatrix},$$

where $g_{mn}$ is the path gain between the m'th UE and the n'th base station; and wherein the apparatus in the given base station is configured to determine whether another base station is a dominant interferer for a given UE by comparing the ratio between the path gain of the other base station and the path gain of the given base station against a threshold.

* * * * *